United States Patent [19]

Huntley et al.

[11] Patent Number: 5,010,341
[45] Date of Patent: Apr. 23, 1991

[54] HIGH PULSE REPETITION FREQUENCY RADAR EARLY WARNING RECEIVER

[75] Inventors: William P. Huntley, Old Lyme; David J. Swanick, Salem, both of Conn.

[73] Assignee: The United States of America as represented by the Secretary of the Navy, Washington, D.C.

[21] Appl. No.: 417,616

[22] Filed: Oct. 4, 1989

[51] Int. Cl.$^5$ ............................................. G01S 13/04
[52] U.S. Cl. ...................................... 342/20; 342/13; 342/195
[58] Field of Search ................... 342/20, 385, 40, 13, 342/194, 195, 197

[56] References Cited

U.S. PATENT DOCUMENTS

| | | | |
|---|---|---|---|
| 3,732,563 | 5/1973 | Nelson | 342/40 |
| 3,872,476 | 3/1975 | Shames et al. | 342/40 |
| 3,889,260 | 6/1975 | Griffin | 342/47 |
| 3,900,848 | 8/1975 | Mears | 342/95 |
| 4,047,170 | 9/1977 | Miller | 342/190 |
| 4,167,006 | 9/1979 | Funatsu et al. | 342/32 |
| 4,181,910 | 1/1980 | Hitterdal | 342/20 |
| 4,217,588 | 8/1980 | Freeny, Jr. | 455/54 X |
| 4,314,247 | 2/1982 | Oude Elberink et al. | 342/40 |
| 4,642,638 | 2/1987 | Callahan, Jr. | 342/45 |
| 4,761,651 | 8/1988 | Matsunaga | 342/40 |
| 4,796,030 | 1/1989 | Colotti et al. | 342/40 |

OTHER PUBLICATIONS

Millman, J., "Microelectronics", Sec. 17-5, pp. 632–635, McGraw-Hill Book Co.
Schilling, D. L., et al, "Electronics Circuits-Discrete and Integrated", 2nd Ed., McGraw-Hill Book Co., Secs. 15.4-1–15.4-3.
Mowle, F. J., "A Systematic Approach to Digital Logic Design", Jul. 1977, pp. 318–325.

Primary Examiner—John B. Sotomayor
Attorney, Agent, or Firm—Michael J. McGowan; Prithvi C. Lall

[57] ABSTRACT

A ten db coupler receives an RF input signal and transmits an attenuated signal through a wideband/narrow band select switch to an RF amplifier. The signal is next processed through an RF amplitude detector. A comparator then receives the signal and generates a pulse in response to signals exceeding a predetermined threshold. A pulse stretcher then eliminates excessive pulses due to noise or other signal oscillations that exceeded the comparator's threshold. A circuit comprising a retriggerable monostable and an OR gate determine if the pulses received exceed a pulse repetition frequency threshold. A ripple counter than eliminates unwanted signals by resetting if a predetermined number is not reached in a specified time. A unique audio signal is then generated if the desired signal is detected. The output signal is audible even though the input signal is of a frequency above the normal hearing threshold. Also a visual signal is provided by a light emitting diode.

5 Claims, 2 Drawing Sheets

HIGH PULSE REPETITION FREQUENCY RADAR EARLY WARNING RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a passive radar early warning system. More particularly the system eliminates spurious received signals and provides a unique audible signal of a frequency within the normal hearing range when the received signal is of a frequency outside the normal hearing range.

(2) Description of the Prior Art

There are several type prior art passive early warning receivers. One prior art system utilized summation of many RF bands following initial RF detection. This was followed by pulse stretching, additional amplification and an audio output. Due to difficulty in discerning between radar pulses and the summed noise the audio output warning of radar illumination suffered.

Another prior art passive early warning system reviewed each RF band separately for detection purposes. This helped reduce the problem of noise summation. However spurious signals and demodulated signals of a frequency outside the normal hearing range still provided a problem.

SUMMARY OF THE INVENTION

Accordingly, it is a general purpose and object of the present invention to provide an improved passive radar detection system. It is a further object to provide audible detection when the demodulated signals are in a range outside the normal hearing range. Another object is the elimination of spurious signals. The system also provides for the elimination of noise and other signal oscillations.

These objects are accomplished with the present invention by providing a system in which the incoming RF signal following amplitude demodulation generates a signal having a pulse each time the incoming signal exceeds a predetermined level. This signal is then processed to eliminate pulses caused by undesirable fluctuations in the incoming signal. The processed signal then undergoes various tests to determine if the pulses are of sufficient frequency to be true signals. The system then provides an audible signal warning within the normal hearing range.

DESCRIPTION OF THE PREFERRED EMBODIMENT

Figure 1:
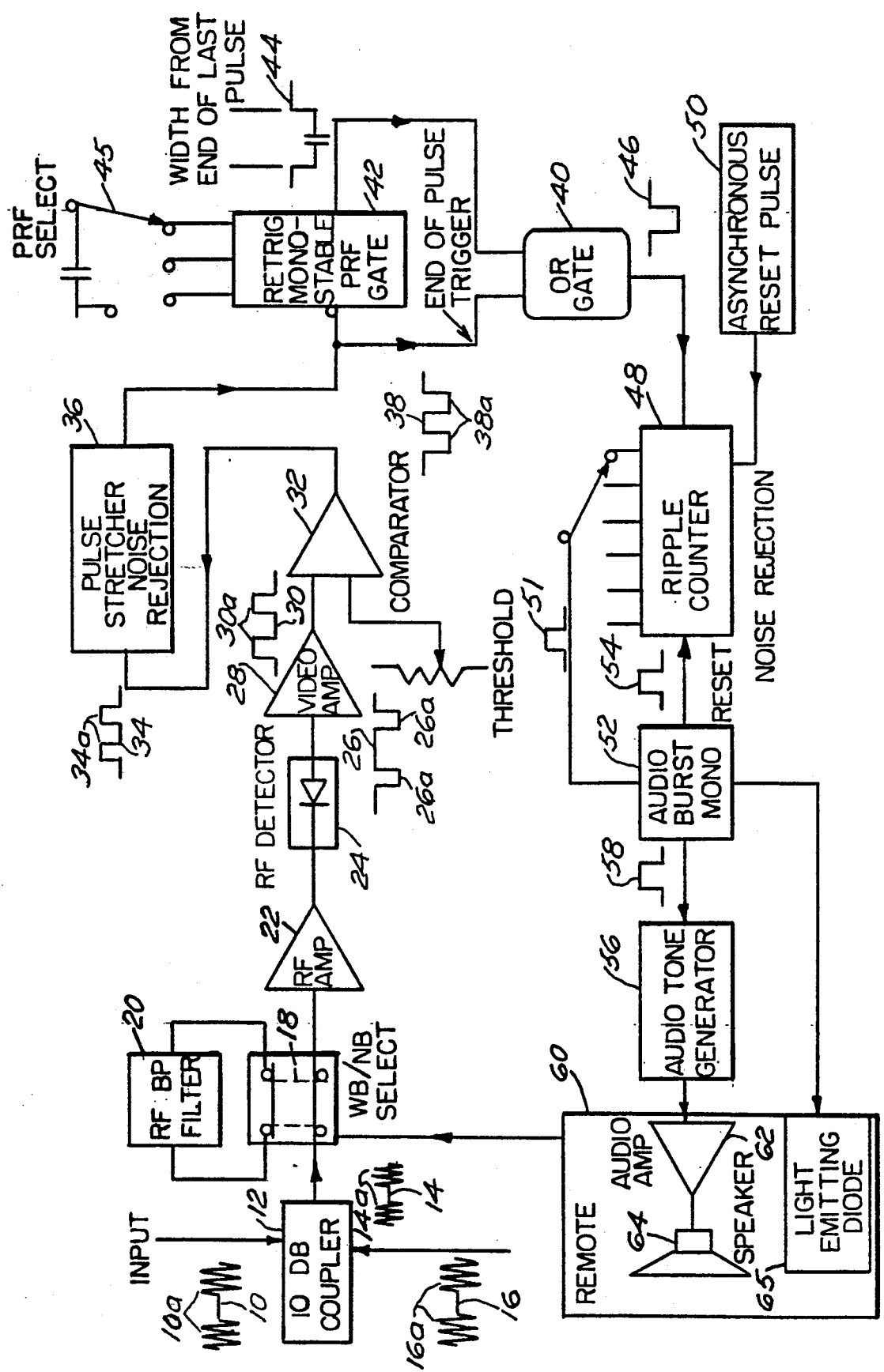
FIG. 1 is a block diagram of a passive early warning radar receiver in accordance with the present invention.
Figure 2:
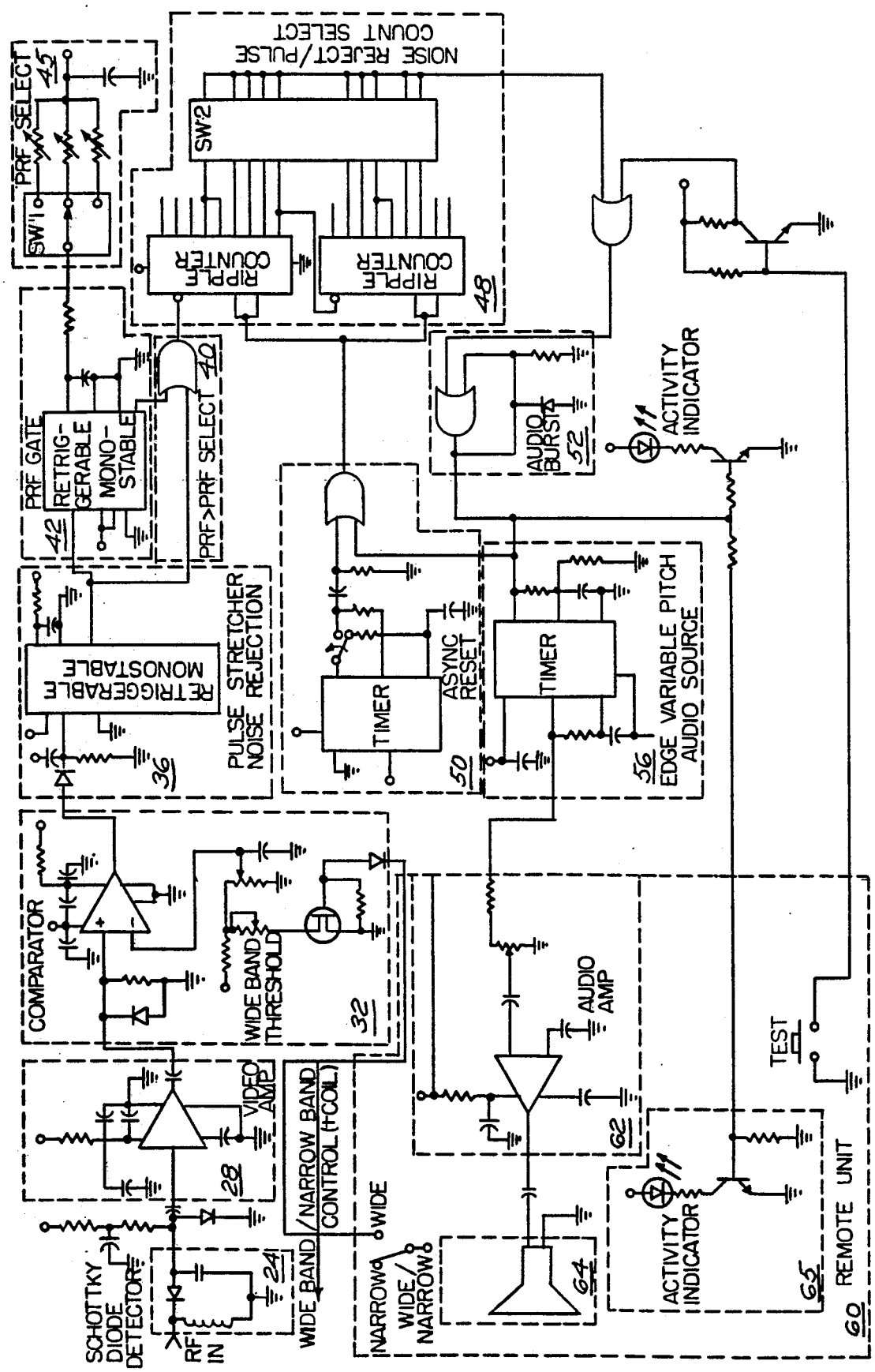
FIG. 2 is a schematic representation of the block diagram of FIG. 1.

Referring now to FIG. 1 there is shown an RF input signal 10 from an antenna system (not shown). The RF input signal 10 contains RF bursts 10a. The signals shown in FIG. 1 are not necessarily drawn to scale. For instance, the spacing between RF bursts 10a is normally much longer than the pulse widths themselves and a drawing to scale would only permit one RF burst 10a to be shown. The heights of other signals shown in FIG. 1 are not necessarily drawn to scale due to amplification factors within the circuit.

A ten db coupler 12 is connected to receive the input signal 10. The ten db coupler transmits a signal 14a which is the input signal 10 reduced by ten db. The signal 14 contains RF bursts 14a. The remainder of the input signal 10 is then transmitted as signal 16 containing RF bursts 16a to other components that do not comprise part of the present invention. The signal 14 is sent to wideband/narrow band select switch 18. The solid lines show the switch 18 position on wideband select. The dashed lines show the switch 18 pOsition on narrow band select. On narrow band select an RF band pass filter 20 is introduced into the circuit. For this description the switch 18 is positioned on wideband select. However, it is to be recognized the operation of the remainder of the system is the same regardless of choice. The signal 14 is then amplified by RF amplifier 22 to offset the loss introduced by ten db coupler 14.

An RF Schottky diode detector 24 then provides amplitude demodulation of the signal. A signal 26 with pulses 26a is shown as the output of detector 24. A video amplifier 28 inverts the amplitude demodulated signal from detector 24 and provides a 1000 to 1 amplitude amplification. The output of video amplifier 28 is shown as signal 30 containing pulses 30a. Comparator 32 receives the amplified signal 30 from video amplifier 28 and generates signal 34 having digital output pulses 34a whenever the amplitude in the received signal exceeds a predetermined level. The digital pulses 34 generated by comparator 32 have their own fixed output level but are of the same frequency as the received signal unless noise or other signal oscillations exceed the predetermined level and generate additional pulses.

The digital signal 34 containing pulses 34a is applied to a pulse stretcher 36 that eliminates defects caused by noise and other signal oscillations that could make a single pulse look like a series of pulses. It does this by stretching out the received pulse to cover the time frame of the oscillations. Signal 38, containing pulses 38a, is the output of pulse stretcher 36.

Signal 38 is applied to an OR gate 40 and is also applied to retriggerable monostable 42. The retriggerable monostable 42 generates a pulse 44 at the trailing end of the received pulse. This pulse 44 has a duration determined by pulse repetition frequency select switch 45. The next pulse 38a must be received by OR gate 40 before the end of each pulse 44 in order to satisfy the requirements of the OR gate 40 for supplying an output pulse 46. If the next pulse from pulse stretcher 36 is not received by the retriggerable monostable 42 within a predetermined time limit from the preceding pulse the output of the retriggerable monostable 42 goes to the higher level and the requirements of the OR gate 40 are not met. In effect the OR gate 40 produces output pulses 46 when the pulse repetition frequency of the received signal 38 is greater than the pulse repetition frequency selected by pulse repetition frequency select switch 45.

The output signal from OR gate 40 is received by ripple counter 48 that counts the number of pulses 46. An asynchronous reset pulse 50 resets ripple counter 48 at predetermined intervals. The ripple counter 48 provides an output 51 if a predetermined value on the number of pulses 46 is reached prior to reset by asynchronous reset pulse switch 50. The ripple counter 48 functions as a noise rejection device. If only noise is present, and no true signal, the frequency of the pulses 46 received will not be sufficient to enable ripple counter 48 to reach its predetermined value prior to reset by the asynchronous reset pulse switch. The output of the ripple counter 48 is supplied to the audio burst monostable 52 that provides a reset pulse 54 to ripple counter 48. Audio burst monostable 52 is connected to audio tone generator 56, and provides a signal 58 to it. Audio burst monostable 52 also drives a light emitting diode 65 in remote station 60 to give visual warning. Audio tone generator 56 is connected to remote station 60 containing audio amplifier 62 and speaker 64. Control of the wideband/narrow band select switch 18 is performed at the remote station 60.

There has therefore been described an improved passive radar detection system. The system is capable of looking at the full spectrum of received signals or of any discrete band within the range received. It eliminates problems associated with undesirable fluctuations and noise. It further determines if the received signals are random or true signals.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A high pulse repetition frequency radar early warning receiver comprising:
    coupler means for receiving an input signal and transmitting an attenuated version of said input signal;
    wideband/narrow band select switch means connected for receiving said attenuated signal, selecting a portion of said attenuated signal and transmitting said selected portion of said attenuated signal;
    RF detector means connected to receive said selected portion of said signal, amplitude detecting said selected portion of said signal, and transmitting the amplitude detected signal;
    comparator means connected to said RF detector for receiving said amplitude detected signal and for generating digital pulses when said amplitude detected signal exceeds a predetermined magnitude;
    pulse stretching means connected to said comparator for receiving said digital pulses, lengthening the time frame of the received pulses, and transmitting the lengthened pulses;
    pulse repetition frequency determining circuit means connected to said pulse stretcher for receiving said lengthened pulses and for generating output pulses when the frequency of the lengthened pulses exceeds a predetermined frequency;
    counting circuit means connected to said pulse repetition frequency determining circuit means for receiving said generated output pulses and for generating an output signal when the number of received pulses exceeds a predetermined value within a predetermined period of time; and
    signal means connected to said counting circuit for receiving said generated output signal and for generating at least one of an audio and visual signal upon receipt of said generated output signal.

2. A high pulse repetition frequency radar early warning receiver according to claim 1 wherein said pulse repetition frequency determining circuit means further comprises:
    a retriggerable monostable connected to said pulse stretching means for receiving said lengthened pulses, said retriggerable monostable having pulse width selection means for generating pulses of predetermined widths starting at the end of said received lengthened pulses; and
    an OR gate connected to said pulse stretching means for receiving said lengthened pulses, and connected to said retriggerable monostable for receiving said pulses of predetermined widths, said OR gate generating output pulses when the frequency of the lengthened pulses exceeds a predetermined frequency.

3. A high pulse repetition frequency radar early warning receiver according to claim 1 wherein said counting circuit means further comprises:
    a ripple counter connected to said OR-gate for receiving said OR gate output pulses, said ripple counter having counting means for counting said OR gate output pulses;
    an asynchronous reset pulse switch connected to said ripple counter for resetting said ripple counter at predetermined intervals; and
    said ripple counter further having signal output generating means for generating an output signal when said counting means reaches a predetermined value.

4. A high pulse repetition frequency radar early warning receiver according to claim 2 wherein said counting circuit means further comprises:
    a ripple counter connected to said OR gate for receiving said OR gate output pulses, said ripple counter having counting means for counting said OR gate output pulses;
    an asynchronous reset pulse switch connected to said ripple counter for resetting said ripple counter at predetermined intervals; and
    said ripple counter further having signal output generating means for generating an output signal when said counting means reaches a predetermined value.

5. A high pulse repetition frequency radar early warning receiver according to claim 1 wherein said pulse repetition frequency determining circuit further comprises:
    a retriggerable monostable connected to receive a plurality of pulses, said retriggerable monostable having pulse width selection means for generating pulses of predetermined widths starting at the end of said received pulses; and
    an OR gate connected to receive said same plurality of pulses as those received by said retriggerable monostable, and connected to the output of said retriggerable monostable for receiving said pulses of predetermined widths, said OR gate generating output pulses when the frequency of the same plurality of pulses exceeds a predetermined frequency determined by the predetermined width of the output pulse of said retriggerable monostable.

* * * * *